United States Patent
Brueckner et al.

(10) Patent No.: US 7,077,897 B2
(45) Date of Patent: Jul. 18, 2006

(54) PIGMENT FOR SAFETY APPLICATIONS

(75) Inventors: Hans-Dieter Brueckner, Darmstadt (DE); Matthias Kuntz, Seeheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/398,649

(22) PCT Filed: Sep. 18, 2001

(86) PCT No.: PCT/EP01/10764

§ 371 (c)(1),
(2), (4) Date: Apr. 9, 2003

(87) PCT Pub. No.: WO02/33010

PCT Pub. Date: Apr. 25, 2002

(65) Prior Publication Data

US 2004/0003758 A1    Jan. 8, 2004

(30) Foreign Application Priority Data

Oct. 14, 2000 (DE) ................................ 100 51 062

(51) Int. Cl.
*C04B 14/20* (2006.01)
(52) U.S. Cl. ........................ 106/415; 106/416; 106/417
(58) Field of Classification Search ................ 106/403, 106/404, 415, 417, 416; 428/404
See application file for complete search history.

(56) References Cited

U.S. PATENT DOCUMENTS

| 5,693,135 A | 12/1997 | Schmid et al. |
| 6,500,251 B1 | 12/2002 | Andes et al. |
| 6,689,205 B1 * | 2/2004 | Bruckner et al. ........... 106/415 |

FOREIGN PATENT DOCUMENTS

| DE | 4419089 | 12/1995 |
| DE | 19618566 | 11/1997 |
| DE | 19618569 | * 11/1997 |

* cited by examiner

Primary Examiner—J. A. Lorengo
Assistant Examiner—Veronica F. Faison

(57) ABSTRACT

The invention relates to a multilayered interference pigment consisting of a transparent carrier material which is coated with alternating layers of colorless, non-absorbent metal oxides having a high and a low refractive index, the difference between the refractive indices being at least 0.1. The inventive pigment can be obtained by alternately coating the transparent carrier material with a metal oxide having a high refractive index and a metal oxide having a low refractive index according to the wet method, by hydrolysing the corresponding water-soluble, inorganic metal compounds, and separating, drying and optionally calcinating the obtained pigment.

18 Claims, No Drawings

PIGMENT FOR SAFETY APPLICATIONS

The present invention relates to an interference pigment, in particular for the production of forgery-proof security applications, based on paper, plastic or other substrates as support material.

Lustre or effect pigments are employed in many areas of industry, for example in automobile paints, in decorative coating, plastics colouring, in paints, printing inks, in particular security printing inks, and in cosmetics.

Their optical effect is based on directed reflection of light at metallic or light-refracting pigment particles which have a predominantly two-dimensional shape and are aligned parallel to one another. Depending on the composition of the pigment platelets, interference, reflection and absorption phenomena produce angle-dependent colour and brightness impressions.

Due to the fact that their optical effects cannot be copied, these pigments are increasingly gaining in importance for the production of forgery-proof documents of value, such as bank notes, cheques, cheque cards, credit cards, tax stamps, postage stamps, rail and air tickets, telephone cards, lottery tickets, gift certificates, identity cards, entry cards, forms and shares.

Security markings produced using the effect pigments, and the absence of these markings or alteration thereof, for example in a colour copy (disappearance of colour flops and lustre effects), are reliably visible to the naked eye without aids and thus facilitate easy distinguishing of the original from the copy.

Pigments which change their interference colour as a function of the viewing angle as a consequence of their layer structure are known.

U.S. Pat. No. 4,434,010 describes optically variable layer systems which have a central, opaque aluminium layer which is coated on both sides alternately with a low-refractive-index, dielectric layer and a semi-transparent metal layer. These pigments are produced by vapour-deposition of various materials onto a continuous tape in a high vacuum, delamination of the resultant layer material and comminution of the resultant particles. They are very expensive owing to the complex production. The pigments have the disadvantage that the central aluminium layer protrudes in an open manner at the break edges and is not covered by the subsequent layers. The pigments thus have reduced weathering stability.

In application systems, for example in a printing ink which is described in U.S. Pat. No. 5,059,245, the optically variable pigments exhibit a colour change (colour flop) between two different colours when the viewing angle is changed. This effect is based essentially on the fact that the optical path length of the low-refractive-index, dielectric layer changes with the viewing angle, which results in different interference conditions and thus in different colours. The intermediate hues are also passed through. However, since they are passed through rapidly and with no transitions, the eye is no longer able to resolve individual colours. The system only comes to rest at the two extremes (steep and flat viewing angles), and discrete hues are perceived. This colour flop cannot be copied. For the production of forgery-proof materials, there is interest in pigments which, compared with the pigments known from the prior art, exhibit additional, uncopyable features and can be produced by a less complicated process.

The object of the invention is to provide a pigment for security applications which, compared with known pigments, has additional, uncopyable features and can be produced by a simple process.

This object is achieved in accordance with the invention by a multilayer interference pigment consisting of a transparent support material which is coated with alternating layers of colourless, non-absorbent metal oxides of high and low refractive index, with the difference between the refractive indices being at least 0.1, obtainable by alternate coating of the transparent support material with metal oxides by the wet process by hydrolysis of the corresponding, water-soluble, inorganic metal compounds, and separating off, drying and optionally calcining the resultant pigment.

Surprisingly, it has been found that, on replacement of the central, opaque aluminium layer in the pigment known from the prior art by a transparent, low-refractive-index, platelet-shaped material which is coated with a high-refractive-index metal oxide, a pigment is obtained which exhibits an additional colour effect. As a consequence of the transparent support material, some of the incident light is allowed to pass through the pigment particles, causing the latter to appear in the complementary colour in transmitted light. If the reflection colour is red, green arises as the transmission colour. In particular in the case of applications in printing on a bright, for example white, background, this light is scattered in all directions by the rough paper surface. The complementary colour is thereby additionally perceived if the interference conditions (illumination angle=viewing angle) are no longer satisfied, for example in the case of perpendicular incidence of light and inclined viewing. This thus gives rise to a pigment having, for example, the reflection colours red and gold and in addition the back-scattered transmission colour green. This three-hue effect cannot occur in pigments having an opaque, central layer since these do not allow any light to pass through and thus remain restricted to a two-colour effect.

This object according to the invention is furthermore achieved by a process for the production of the pigment according to the invention in which the transparent support material is suspended in water and coated alternately with a colourless, non-absorbent metal oxide of high and low refractive index by addition and hydrolysis of the corresponding inorganic, water-soluble metal compounds, with the pH necessary for precipitation of the respective metal oxide being set and kept constant by simultaneous addition of acid or base, and the coated support material is subsequently separated off from the aqueous suspension, dried and optionally calcined.

The invention also relates to the use of the pigment according to the invention for the production of forgery-proof materials, For this purpose, they can be employed as mixtures with commercially available pigments, for example inorganic and organic absorption pigments, metal-effect pigments, LCP pigments and pearlescent pigments.

Suitable transparent support materials are phyllosilicates, in particular natural and synthetic mica, talc, kaolin, platelet-shaped aluminium oxide, and glass and silicon dioxide platelets.

The size of the base substrate is not crucial per se and can be matched to the respective application. In general, the platelet-shaped substrates have a thickness of between 0.1 and 5 μm, in particular between 0.2 and 4.5 μm. The extension in the two other directions is usually between 1 and 250 μm, preferably between 2 and 200 μm, and in particular between 5 and 60 μm.

The colourless, non-absorbent metal oxide of high refractive index is a single oxide or a mixture of oxides. Examples thereof are titanium dioxide, zirconium oxide, zinc oxide and tin oxide. The term metal oxide of high refractive index is taken to mean metal oxides whose refractive index is greater than 1.8.

Suitable colourless, non-absorbent metal oxides of low refractive index are silicon dioxide, aluminium oxide, AlOOH, boron trioxide or mixtures thereof. If desired, the oxide layer of low refractive index may comprise alkali metal and alkaline earth metal oxides as constituents. The term metal oxides of low refractive index is taken to mean metal oxides whose refractive index is less than 1.8.

The thickness and number of the layers of metal oxides of high and low refractive index is essential for the optical properties of the pigment. For a pigment having intense interference colours, the thickness of the individual layers must be set precisely in relation to one another.

The pigment according to the invention is built up from at least three layers applied to the support material. The metal oxide of high refractive index used is preferably titanium dioxide, and the metal oxide of low refractive index used is preferably silicon dioxide. In the case of titanium dioxide and silicon dioxide as layer materials, the thicknesses of the individual layers must be set to the following values:
1st layer: titanium dioxide, layer thickness: 65–95 nm
2nd layer: silicon dioxide, layer thickness: 160–240 nm
3rd layer: titanium dioxide, layer thickness: 50–70 nm In addition to the 3 layers mentioned above, further layer packages of low- and high-refractive-index materials may be applied.

If other layer materials or production processes are used, the layer thicknesses must be set corresponding to their refractive indexes.

A preferred embodiment of the pigment according to the invention has the following layer structure:
1st layer: titanium dioxide, layer thickness: 80 nm
2nd layer: silicon dioxide, layer thickness: 200 nm
3rd layer: titanium dioxide, layer thickness: 60 nm The metal-oxide layers are applied by wet-chemical processes, it being possible to use the wet-chemical coating processes developed for the production of pearlescent pigments; processes of this type are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or also in further patent documents and other publications.

For the coating, the substrate particles are suspended in water, and one or more hydrolysable metal salts are added at a pH which is suitable for hydrolysis, the pH being selected in such a way that the metal oxides or metal oxide hydrates are precipitated directly onto the particles without secondary precipitations occurring. The pH is usually kept constant by simultaneous metering-in of a base. The pigments are subsequently separated off, washed and dried and optionally ignited, it being possible for the ignition temperature to be optimised with respect to the coating present in each case. If desired, the pigments can be separated off, dried and optionally ignited after application of individual coatings and then re-suspended for the precipitation of the further layers.

The titanium dioxide layers are preferably applied by the process described in U.S. Pat. No. 3,553,001.

An aqueous titanium salt solution is added slowly to a suspension of the material to be coated which has been heated to about 50–100° C., in particular 70–80° C., and a substantially constant pH of about 0.5–5, in particular about 1.5–2.5, is maintained by simultaneous metering-in of a base, such as, for example, aqueous ammonia solution or aqueous alkali metal hydroxide solution. As soon as the desired layer thickness of the $TiO_2$ precipitation has been reached, the addition of the titanium salt solution and the base is terminated.

This process, also known as the titration process, is distinguished by the fact that an excess of titanium salt is avoided. This is achieved by adding to the hydrolysis only such an amount per time unit as is necessary for uniform coating with the hydrated $TiO_2$ and as can be taken up per time unit by the available surface of the particles to be coated. There is therefore no formation of hydrated titanium dioxide particles which have not been precipitated on the surface to be coated.

The following process should be used for the application of the silicon dioxide layers: a soda water-glass solution is metered into a suspension of the material to be coated which has been heated to about 50–100° C., in particular 70–80° C. The pH is kept constant at from 4 to 10, preferably from 6.5 to 8.5, by simultaneous addition of 10% hydrochloric acid. After addition of the water-glass solution, the mixture is stirred for a further 30 minutes.

The production of the pigment according to the invention is described in greater detail in DE 196 18 569.

It is furthermore possible to subject the finished pigment to after-coating or after-treatment which further increases the light, weather and chemical stability, or simplifies handling of the pigment, in particular incorporation into various media. Suitable after-coating or after-treatment processes are, for example, the processes described in German Patent 22 15 191, DE-A 31 51 354, DE-A 32 35 017 or DE-A 33 34 598.

The substances additionally applied make up only from about 0.1 to 5% by weight, preferably from about 0.5 to 3% by weight, of the total pigment.

Owing to its uncopyable optical effects, the pigment according to the invention is preferably used for the production of forgery-proof materials from paper and plastic. In addition, the pigment according to the invention can also be used in formulations such as paints, printing inks, varnishes, in plastics, ceramic materials and glasses, in cosmetics, for laser marking of paper and plastics and for the production of pigment preparations in the form of pellets, chips, granules, briquettes, etc.

The term forgery-proof materials made from paper is taken to mean, for example, documents of value, such as banknotes, cheques, tax stamps, postage stamps, rail and air tickets, lottery tickets, gift certificates, entry cards, forms and shares. The term forgery-proof materials made from plastic is taken to mean, for example, cheque cards, credit cards, telephone cards and identity cards.

For the production of printing inks, the pigment is incorporated into binders which are usually suitable for printing inks. Suitable binders are cellulose, polyacrylate-polymethacrylate, alkyd, polyester, polyphenol, urea, melamine, polyterpene, polyvinyl, polyvinyl chloride and polyvinylpyrrolidone resins, polystyrenes, polyolefins, coumarone-indene, hydrocarbon, ketone, aldehyde and aromatic-formaldehyde resins, carbamic acid, sulfonamide and epoxy resins, polyurethanes and/or natural oils, or derivatives of the said substances.

Besides the film-forming, polymeric binder, the printing ink comprises the conventional constituents, such as solvents, if desired water, antifoams, wetting agents, constituents which affect the rheology, antioxidants, etc.

The pigments according to the invention can be employed for all known printing processes. Examples thereof are gravure printing, flexographic printing, screen printing, bronze printing and offset printing.

Since all known plastics can be pigmented with pearlescent pigments, the production of forgery-proof materials from plastic is not limited by the use of the pigment according to the invention. It is suitable for all mass colourings of thermoplastics and thermosetting plastics and for the pigmentation of printing inks and varnishes for surface finishing thereof. The pigment according to the invention can be used for pigmenting acrylonitrile-butadiene-styrene copolymers, cellulose acetate, cellulose acetobutyrate, cellulose nitrate, cellulose propionate, artificial horn, epoxy resins, polyamide, polycarbonate, polyethylene, polybutylene terephthalate, polyethylene terephthalate, polymethyl methacrylate, polypropylene, polystyrene, polytetrafluoroethylene, polyvinyl chloride, polyvinylidene chloride, polyurethane, styrene-acrylonitrile copolymers and unsaturated polyester resins.

In order to obtain an optimum optical effect, it should be ensured during processing that the platelet-shaped pigment is well oriented, i.e. is aligned as parallel as possible to the surface of the respective medium. This parallel orientation of the pigment particles is best carried out from a flow process, and is generally achieved in all known methods of plastic processing, painting, coating and printing.

The invention claimed is:

1. A multilayer interference pigment for security applications, consisting of a transparent support material which is coated with alternating layers of colourless, non-absorbent metal oxides of high and low refractive index, with the difference between the refractive indices being at least 0.1, obtainable by alternate coating of the transparent support material with a metal oxide of high refractive index and a metal oxide of low refractive index by the wet process by hydrolysis of the corresponding, water-soluble, inorganic metal compounds, and separating off, drying and optionally calcining the resultant pigment, whereby said multilayer interference pigment exhibits a perceivable three-hue effect of two reflection colors and one transmission color.

2. An interference pigment according to claim 1, in which the transparent support material is a phyllosilicate, platelet-shaped aluminium oxide, or glass or silicon dioxide platelets.

3. An interference pigment according to claim 1, in which the colourless, non-absorbent metal oxide of high refractive index is titanium dioxide, zirconium oxide, zinc oxide, tin oxide or a mixture of these oxides.

4. An interference pigment according to claim 1, in which the colourless, non-absorbent metal oxide of low refractive index is silicon dioxide, aluminium oxide, AlOOH, boron trioxide or a mixture of these oxides.

5. A process for the production of the interference pigment according to claim 1, in which the transparent support material is suspended in water and coated alternately with a colourless, non-absorbent metal oxide of high refractive index and a colourless, non-absorbent metal oxide of low refractive index by addition and hydrolysis of the corresponding inorganic, water-soluble metal compounds, the pH necessary for the precipitation of the respective metal oxide being set and kept constant by simultaneous addition of acid or base, and the coated support material is subsequently separated off from the aqueous suspension, dried and optionally calcined.

6. A process for the production of the interference pigment according to claim 5, in which the colourless, non-absorbent metal oxide of high refractive index is titanium dioxide, zirconium oxide, zinc oxide, tin oxide or a mixture of these oxides.

7. A process for the production of the interference pigment according to claim 5, in which the colourless, non-absorbent metal oxide of low refractive index is silicon dioxide, aluminium oxide, AlOOH, boron trioxide or a mixture of these oxides.

8. In a forgery-resistant security application comprising paints, printing inks, plastics, or paper, the improvement wherein said paint, printing ink, plastic or paper further comprises a pigment according to claim 1.

9. An interference pigment according to claim 1, in which the transparent support material is a mica, talc or kaolin.

10. In a paint, printing ink, varnish, plastic, ceramic material, glass, cosmetic, or laser marking composition for paper or plastics, comprising a pigment, the improvement wherein the pigment is one according to claim 1.

11. A multilayer interference pigment for security applications, comprising a transparent support material which is coated with at least three layers comprising titanium dioxide layer having a layer thickness of from 65–95 nm, a silicon dioxide layer having a layer thickness of from 160–240 nm and a further titanium dioxide layer having a layer thickness of from 50–70 nm.

12. An interference pigment according to claim 11, in which the transparent support material is phyllosilicate, talc or kaolin, platelet-shaped aluminium oxide, or glass or silicon dioxide platelets.

13. An interference pigment according to claim 11, which exhibits red and gold reflection colours and green transmission colour.

14. An interference pigment according to claim 13, containing further layer sets of alternating low and high refractive index materials.

15. A process for the production of an interference pigment according to claim 12, in which the transparent support material is suspended in water and coated alternately with a layer of titanium dioxide, a layer of silicon dioxide and a further layer of titanium dioxide by addition and hydrolysis of the corresponding inorganic, water-soluble metal compounds, the pH necessary for the precipitation of the respective metal oxide being set and kept constant by simultaneous addition of acid or base, and the coated support material is subsequently separated off from the aqueous suspension, dried and optionally calcined.

16. In a forgery-resistant security application comprising paints, printing inks, plastics, or paper, the improvement wherein said paint, printing ink, plastic or paper further comprises a pigment according to claim 11.

17. In a paint, printing ink, varnish plastic, ceramic material, glass, cosmetic, laser marking composition for paper or plastics, comprising a pigment, the improvement wherein the pigment is one according to claim 11.

18. An interference pigment according to claim 11, in which the transparent support material is a mica, talc or kaolin.

* * * * *

UNITED STATES PATENT AND TRADEMARK OFFICE
CERTIFICATE OF CORRECTION

PATENT NO. : 7,077,897 B2  Page 1 of 1
APPLICATION NO. : 10/398649
DATED : July 18, 2006
INVENTOR(S) : Brueckner et al.

It is certified that error appears in the above-identified patent and that said Letters Patent is hereby corrected as shown below:

Column 6, line 42, reads "claim 12," should read -- claim 11, --
Column 6, line 56, reads "varnish plastic," should read -- varnish, plastic, --

Signed and Sealed this

Twenty-seventh Day of February, 2007

JON W. DUDAS
*Director of the United States Patent and Trademark Office*